United States Patent [19]
Williams

[11] 3,729,930
[45] May 1, 1973

[54] GAS TURBINE ENGINE

[75] Inventor: David Eyre Williams, Brinklow, England

[73] Assignee: Rolls Royce Limited, Derby, England

[22] Filed: June 23, 1970

[21] Appl. No.: 49,146

[52] U.S. Cl. ............... 60/39.58, 415/116, 415/178, 416/97
[51] Int. Cl. .................................................. F01d 5/08
[58] Field of Search .................. 60/39.58, 39.66; 415/115, 116; 416/90, 90 X, 95, 96, 97

[56] References Cited

UNITED STATES PATENTS

| | | | |
|---|---|---|---|
| 2,647,368 | 8/1953 | Triebbnigg et al. | 416/96 A |
| 2,684,831 | 7/1954 | Grantham | 416/97 |
| 2,981,066 | 4/1961 | Johnson | 415/115 |
| 3,527,543 | 9/1970 | Howald | 416/96 |

FOREIGN PATENTS OR APPLICATIONS

| | | | |
|---|---|---|---|
| 215,390 | 2/1958 | Australia | 416/97 |
| 774,425 | 5/1957 | Great Britain | 60/39.58 |

*Primary Examiner*—Henry F. Raduazo
*Attorney*—Cushman, Darby & Cushman

[57] ABSTRACT

An industrial gas turbine engine comprises a multi-stage axial compressor, combustion equipment, a multi-stage compressor driving turbine, a power turbine and an exhaust duct, the compressor driving turbine being provided with cooling means to cool the blades of said turbine. The cooling means comprises a flow of steam from the compressor which flows onto the surface of each turbine rotor blade through slots in the rotor rim. The steam also flows over the surface of the turbine rotor between adjacent blades and the space between adjacent blades is filled with a honeycomb material, the cells of which constitute ducts for the flow of steam. The stator vanes of the compressor driving turbine are cooled by steam from a heat exchange means which comprises a supply of pure water to a coil in the exhaust duct and a duct from this coil which is in communication with slots upstream of the nozzle guide vanes, the interiors of the nozzle guide vanes, the slots in the turbine rotor, slots in the engine casing upstream of the stator vanes and the interior of the stator vanes.

3 Claims, 4 Drawing Figures

Inventor
David E. Williams
By
Cushman, Darby, Cushman Attorney

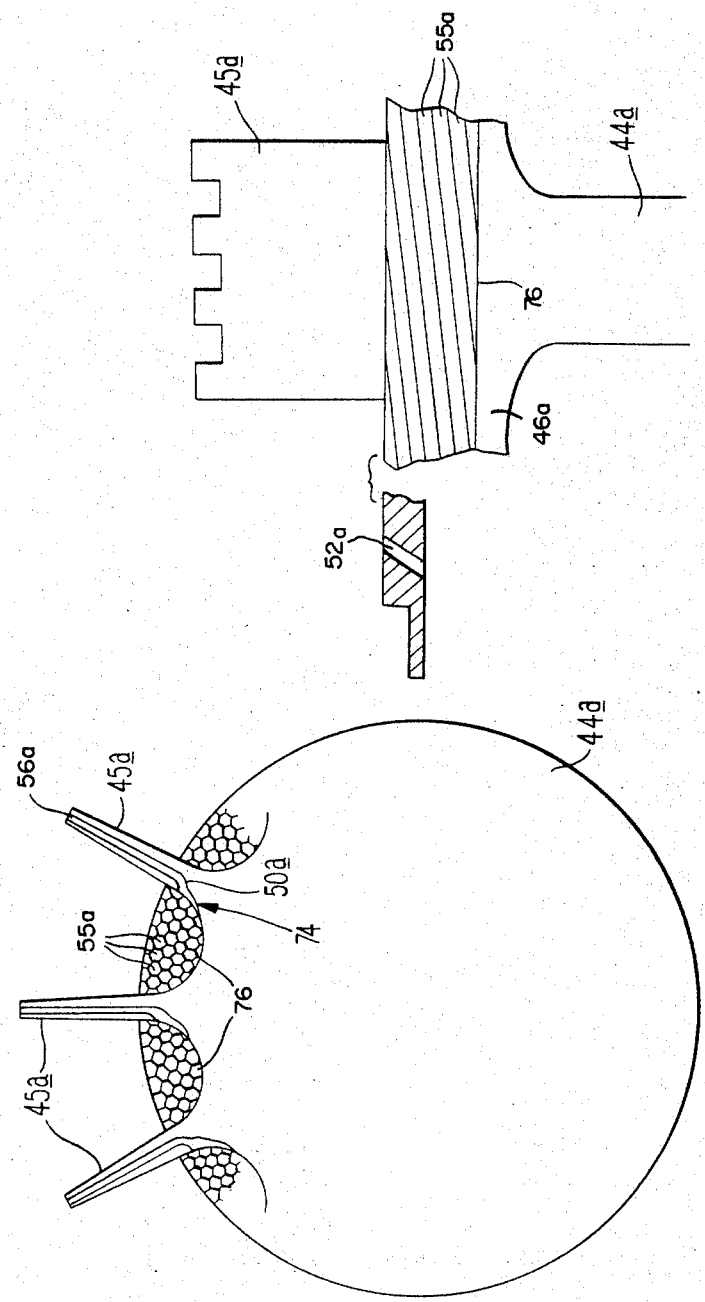

ic gas turbine engine.

GAS TURBINE ENGINE

This invention relates to gas turbines and is particularly, but not exclusively, concerned with a gas turbine for use in an industrial gas turbine engine.

According to the present invention a gas turbine comprises a rotor, a row of equi-angularly spaced apart rotor blades secured to the rotor steam generating means and first cooling fluid supply means adapted to direct cooling fluid at the leading edge of each rotor blade so as to form on each rotor blade a layer of the cooling fluid which extends over at least a major proportion of the surface of the rotor blade, the coding fluid being constituted by steam produced by the steam generating means.

In a preferred embodiment of the invention, there is provided second cooling fluid supply means adapted to direct cooling fluid into the spaces between adjacent rotor blades so as to form a layer of the cooling fluid on those parts of the surface of the rotor between the rotor blades.

The rotor may have at least one further row of equi-angularly spaced apart rotor blades secured thereto downstream of the first-mentioned row; in this case the rotor blades of the or each further row may be positioned to receive cooling fluid which has passed over the rotor blades of the first-mentioned row, or preferably, the or each further row of rotor blades may be provided with respective first and second cooling fluid supply means similar to those associated with the first-mentioned row of rotor blades.

The or each first cooling fluid supply means preferably includes a respective slot positioned in the radially outer surface of the rotor in front of the leading edge of each rotor blade, each slot communicating with the interior of the rotor.

The slots may be arcuate in plan view.

The or each second cooling fluid supply means preferably includes a plurality of ducts within the rotor, extending approximately parallel to the mean chord lines of the rotor blades, each duct communicating with the interior of the rotor.

The majority of the ducts preferably extend through relatively low stress areas of the rotor between points to which adjacent rotor blades are secured, and may be constituted by incorporating honeycomb type structure in said low stress areas of the rotor.

Preferably at least some of the ducts communicate with the radially outer surface of the rotor so as to discharge the cooling fluid in approximately the same direction as, but at a small acute angle to, the direction of flow of the working fluid of the turbine, whereby to form said layer of cooling fluid on those parts of the surface of the rotor between the rotor blades.

The rotor blades may also be provided with internal cooling passages adapted to be supplied with the cooling fluid.

Preferably, the gas turbine is provided upstream of the first-mentioned row of rotor blades and if appropriate between each adjacent row of rotor blades, with a row of equi-angularly spaced apart stator blades secured at their radially outer ends to a casing coaxial with the turbine. In this case the casing may be provided with first cooling fluid supply means which is adapted to direct cooling fluid at the leading edge of each stator blade of at least the upstream row of stator blades so as to form on each stator blade a layer of the cooling fluid which extends over at least a major proportion of the surface of the stator blade, and may also be provided with second cooling fluid supply means adapted to direct cooling fluid into the spaces between adjacent stator blades of at least the upstream row of stator blades so as to form a layer of the cooling fluid on those parts of the internal surface of the casing between the stator blades.

The radially outer ends of the rotor blades and/or the radially inner ends of the stator blades may have labyrinth seals formed thereon, which seals are respectively adapted to co-operate with the internal surface of the casing and the external surface of the rotor respectively so as to reduce the flow of working fluid across the tips of the blades.

The invention also includes a gas turbine engine comprising, in flow series, compressor means, combustion means and a gas turbine in accordance with any of the preceding statements of invention.

The steam generating means preferably comprises an exhaust heat exchanger connected to receive the combustion products exhausted by the gas turbine engine in heat exchange relationship with water, and may communicate with the interior of the rotor via respective ducts within each of the upstream row of stator blades.

The invention will now be described by way of non-limitative example only, with reference to the accompanying drawings, in which:

FIG. 3 is a diagrammatic sectional view of a further embodiment of a gas turbine in accordance with the present invention, perpendicular to the axis thereof;

FIG. 4 is a section on the line 4—4 of FIG. 3 and

Figure 1:
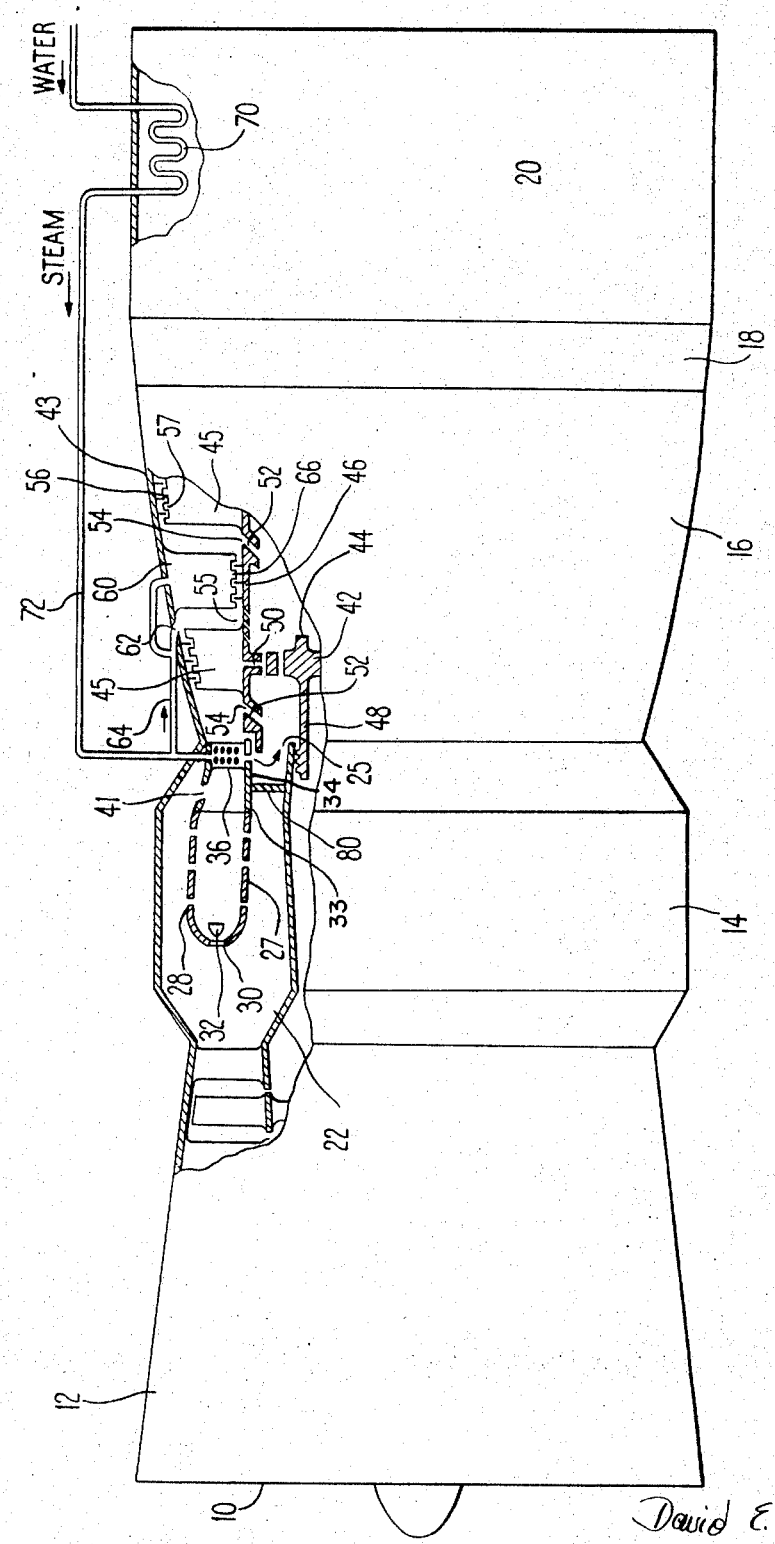
FIG. 1 is a diagrammatic part-sectional view of a gas turbine engine provided with a gas turbine in accordance with the present invention.

Referring to FIG. 1, the gas turbine engine comprises, in flow series, an air inlet 10 an axial flow compressor 12 combustion equipment 14 an axial flow turbine 16 drivingly connected to the compressor 12 by a shaft (not shown), a free power turbine 18 adapted to be drivingly connected to a load (not shown) and an exhaust duct 20.

The combustion equipment 14 comprises a plurality of combustion chambers 22 which are equi-angularly spaced apart about the axis of the engine. The upstream ends of each of the chambers 22 communicate with the outlet of the compressor 12 while the downstream ends communicate with an annular outlet 25 via an annular array of guide vanes 26. Each of the chambers 22 also contains a flame tube 27, the flame tubes 27 being spaced from their respective chambers 22 and communicating therewith by way of perforations 28. Each flame tube 27 also has an air inlet 30 communicating with the chamber 22 at its upstream end, contains a burner 32 connected to be supplied with fuel by means not shown, and has a downstream end 33 which communicates with an annular outlet 34 arranged coaxially around the outlet 25.

The outlet 34 communicates with the turbine 16 via an annular array of stator blades constituted by hollow nozzle guide vanes 36, the interiors of which communicate with a respective one of the chambers 22. Arcuate slots 41 are provided in the radially outer wall of the outlet 34 upstream of the leading edges of each of the vanes 36, the slots 41 communicating with the chambers 22.

The turbine 16 comprises a rotor 42 coaxially mounted within a substantially cylindrical casing 43 and consisting of a number (typically two) of axially spaced discs 44 each having a row of equi-angularly spaced apart hollow turbine blades 45 welded to its periphery. The discs 44 are perforated mainly in their areas of low stress concentration, i.e. between the blade attachment points, and are provided with axially extending flanges 46 about their entire peripheries, the flanges 46 of adjacent discs 44 being welded together to form a drumlike turbine rotor assembly.

The upstream disc 44 is provided with an upstream-projecting annular flange 48 positioned coaxially within the flange 46, and the flanges 46, 48 sealingly co-operate with the external and internal boundaries respectively of the annular outlet 25 to provide communication between the chambers 22 and the interior of the rotor 42. The flanges 46 are provided with a number of equiangularly spaced apart substantially radially directed passages 50 which communicate between the interior of the rotor 42 and the interiors of each of the blades 45, and with a further number of equiangularly spaced apart passages 52 which extend at an angle of about 45° to the axis of the rotor 42 and which communicate between the interior of the rotor 42 and respective arcuate slots 54 provided in the radially outer surface of the rotor 42 in front of the leading edge of the blades 45 (see FIG. 2).

Those parts of the flanges 46 between adjacent blades 45 and between adjacent rows of blades 45 are provided with a large number of small passages 55 which communicate between the interior and the radially outer surface of the rotor 42. The axes of the passages 55 are disposed at a small acute angle, typically less than 10°, to the direction of flow of the working fluid in the turbine 16.

The blades 45, of which there are typically 17, are made from welded sheet metal and are relatively short: typically, their height is about one third of their chord. The radially outer end of each blade 45 is provided with an outlet 56 which communicates with the interior of the blade, and is further provided with a diagrammatically illustrated labyrinth seal 57 which co-operates with the internal surface of the casing 43 so as to reduce the flow of working fluid across the tip of the blade 45.

Between each pair of adjacent rows of turbine blades 45 is provided a row of equiangularly spaced apart hollow stator blades 60, the radially outer end of each of which is secured, by welding or other suitable means, to the casing 43. The casing 43 is provided with respective slots 62 which are similar in shape to the slots 54 and positioned in front of the leading edge of each of the stator blades 60 and which communicate with a duct 72 via ducts 64. The interiors of the stator blades 60 also communicate with duct 72 the ducts 64. It will be appreciated that the ducts 64 may be constituted by channels formed within the wall of the casing 43. Those parts of the casing 43 between adjacent blades 60 and between adjacent rows of blades 60 are provided with a large number of small passages (not shown) which are similar to the passages 55 and which also communicate with a respective one of the chambers 22.

The blades 60 are made from welded sheet metal and their radially inner ends are provided with respective outlets (not shown) and with diagrammatically illustrated labyrinth seals 66 which co-operate with the radially outer surface of the flanges 46 so as to reduce the flow of working fluid across the tips of the blades 60.

Figure 2:
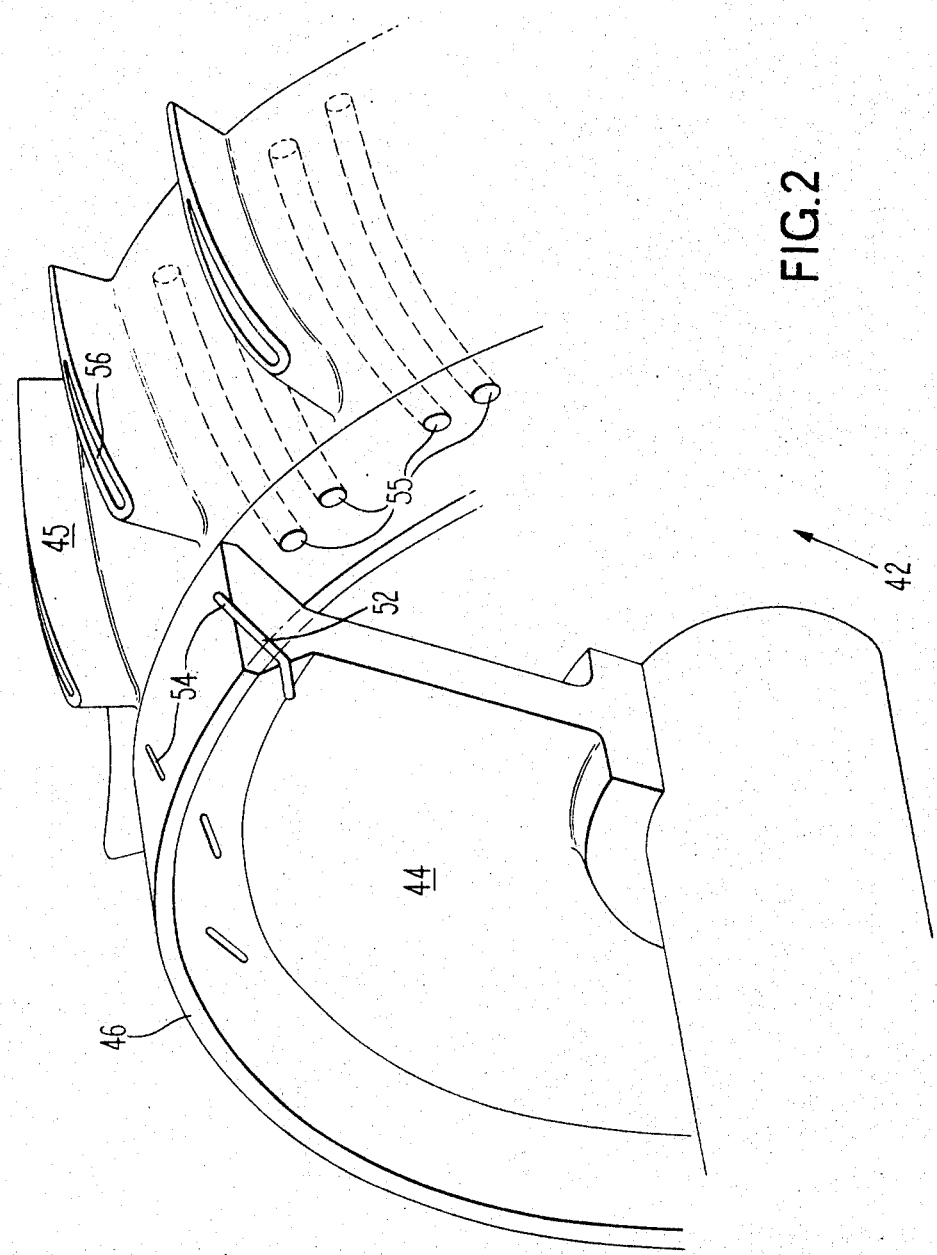
FIG. 2 is a perspective view of part of the gas turbine engine of FIG. 1.

An alternative turbine construction is shown in FIGS. 3 and 4, parts similar to those shown in FIGS. 1 and 2 having the same reference numerals with the suffix $a$. The turbine discs 44a have scalloped rims, each scalloped portion forming a smooth curve between the attachment points of adjacent blades 45a, and the flanges 46a being welded together between the scalloped portions. It will be appreciated that the portions of each disc 44a removed to form the scallops constitute low stress areas of the disc.

The scalloped portions are filled in by respective suitably shaped members 76 of high temperature resistant honeycomb or other cellular material, each member 76 extending through corresponding scalloped portions of adjacent discs 44a and being suitably bonded thereto. The cells of the honeycomb material constitute a plurality of ducts 55a whose axes are curved so as to extend approximately parallel to the mean chord lines of the rotor blades 45a. The honeycomb material is also arranged so that each of the ducts 55a communicates between the outlet 25a and the radially outer surface of the rotor 43a so as to discharge cooling fluid in approximately the same direction as, but at a small angle to, the direction of flow of the working fluid of the turbine 16a.

It will be appreciated, therefore, that cooling air flows from the outlet 25a through the ducts 55a so as to form a layer of the cooling air which covers substantially the whole of the external surface of the rotor 43a.

The passages 50a communicate with several of the ducts 55a, as shown at 74, while a similar arrangement (not shown) is used to establish communication between passages 52a and the ducts 55a.

The heat exchanger coil 70, instead of containing a liquid metal, is arranged to be supplied with very pure water by pump means (not shown) so as to produce high pressure steam. The duct 72 which in this embodiment of the invention contains high pressure steam typically at a pressure of 400 p.s.i., communicates with the ducts 64, the slots 41 and, via the interiors of the nozzle guide vanes 36, with the annular space defined between the wall 80 and the outlet 25, all of which no longer communicate with the chambers 22.

It will be appreciated that this embodiment of the invention could incorporate a turbine similar to that shown in FIGS. 3 and 4 instead of the turbine 16.

It will also be appreciated that the embodiment of the invention hereinbefore described produce layers of cooling steam which cover substantially the whole of the surfaces defining the flow duct within the turbine 16. The gas turbine engine may therefore be operated at a comparatively high temperature, thus producing more power for a given mass flow. The use of honeycomb members 76 offers the additional advantage of light weight.

Various modifications to the described engine are possible. Thus the temperature of the cooling fluid leaving the chambers 22 may be varied or controlled by incorporating secondary combustion equipment in the chambers 22, instead of or in addition to, providing the heat exchanger coils 24. Additionally, as steam is the coolant the steam could be produced in a waste heat boiler in any part of a power plant which includes the described engine. It will further be appreciated that the invention is applicable to gas turbines other than that described, for example gas turbines for use in gas turbine engines adapted to operate on a helium or carbon dioxide closed cycle.

What we claim is:

1. A gas turbine comprising a rotor, a row of equiangularly spaced apart rotor blades secured to said rotor, steam generating means, a first cooling fluid supply means arranged to direct cooling fluid at the leading edge of each of said rotor blades so as to form on each rotor blade a layer of cooling fluid which extends over at least a major portion of the surface of the rotor blade, said first cooling fluid supply means including a plurality of slots positioned in the radially outer surface of the rotor in front of the leading edge of each blade, each slot communicating with the interior of the rotor and arranged for the flow therethrough of at least a portion of the cooling fluid, said cooling fluid being constituted by the steam from said steam generating means, and a second cooling fluid supply means arranged to direct cooling fluid into the spaces between adjacent rotor blades so as to form a layer of cooling fluid on those parts of the surface of the rotor between the rotor blades, said second cooling fluid supply means including a plurality of ducts within the rotor extending approximately parallel to the means chord lines of the rotor blades, each duct communicating with the interior of the rotor, said rotor having relatively low stress areas between points to which adjacent rotor blades are secured, and a majority of said last-mentioned ducts being constituted by a honeycomb type structure carried in said low stress areas of said rotor.

2. A gas turbine engine as claimed in claim 1 wherein the steam generating means comprises an exhaust heat exchanger connected to receive the combustion products exhausted by the gas turbine engine in heat exchange relationship with water.

3. A gas turbine as claimed in claim 1 wherein the rotor has at least one further row of equiangularly spaced apart rotor blades secured thereto downstream of the first-mentioned row, each further row of rotor blades being provided with first and second cooling means similar to those associated with the first-mentioned row of rotor blades.

* * * * *